(12) United States Patent
Simpson (10) Patent No.: US 8,727,692 B2
(45) Date of Patent: May 20, 2014

(54) REMOVABLE PLATFORM AND LOAD BED FOR VEHICLES

(76) Inventor: Dana William Simpson, Penticton (CA)

( * ) Notice: Subject to any disclaimer, the term of this patent is extended or adjusted under 35 U.S.C. 154(b) by 610 days.

(21) Appl. No.: 12/805,993

(22) Filed: Aug. 27, 2010

(65) Prior Publication Data

US 2012/0051876 A1    Mar. 1, 2012

(51) Int. Cl.
  *B60P 1/34* (2006.01)
(52) U.S. Cl.
  USPC .......................................... 414/477; 414/500
(58) Field of Classification Search
  USPC ..................... 414/477–479, 498–500
  See application file for complete search history.

(56) References Cited

U.S. PATENT DOCUMENTS

| | | | | |
|---|---|---|---|---|
| 2,786,590 A * | 3/1957 | Edwards et al. | ............... | 414/477 |
| 3,145,009 A * | 8/1964 | French et al. | ................. | 248/150 |
| 3,362,552 A * | 1/1968 | Thiele | ............................ | 414/469 |
| 5,556,249 A * | 9/1996 | Heine | ............................ | 414/500 |
| 5,755,549 A * | 5/1998 | Ogrodnick | ..................... | 414/500 |
| 6,857,840 B2 * | 2/2005 | Simpson et al. | ............... | 414/491 |
| 7,033,128 B2 * | 4/2006 | Poindexter | ..................... | 414/544 |

* cited by examiner

*Primary Examiner* — Jonathan Snelting
(74) *Attorney, Agent, or Firm* — Morrison & Foerster LLP (57) ABSTRACT

A movable frame is adapted to be loaded onto and unloaded from a stationary frame mounted on a vehicle. A platform is releasably mountable onto said movable frame. The platform and movable frame may be hoisted simultaneously when being loaded and unloaded from the stationary frame. The platform includes a downwardly depending support legs which are of sufficient length to maintain the platform elevated above a first portion of the movable frame which is inserted under said platform when said movable frame is resting in a lowered position when unloaded from the stationary frame. The movable frame may be raised to engage with the underside of said platform. Interlocks cooperate between said platform and said movable frame so that the movable frame centers onto and mates with said underside of said platform.

22 Claims, 13 Drawing Sheets

REMOVABLE PLATFORM AND LOAD BED FOR VEHICLES

FIELD OF THE INVENTION

This invention relates to the field of devices for loading and unloading a movable frame from a stationary frame mounted on a vehicle, and in particular to a removable platform and load bed for loading and unloading from a stationary frame on a vehicle wherein, once unloaded, the platform on the movable frame may be detached allowing removal of the movable frame from under the platform for re-loading of the movable frame onto the stationary frame.

BACKGROUND OF THE INVENTION

As stated in my Canadian Patent No. 2,434,792 which issued Apr. 13, 2010 for a Removable Load Bed for Vehicles, a frame on a vehicle may be adapted for loading and unloading a movable frame therefrom so that for example the movable frame may be unloaded onto the ground and thereafter may be loaded up from the ground and onto the stationary frame of the vehicle for transportation of the movable frame and associated load bed mounted thereon. Thus in my previous invention for a removable load bed for vehicles, I provided an apparatus having a stationary frame and a movable frame that had a flexible connector mounted on the movable frame for releasably engaging a drive on the stationary frame. A locking system was mounted on the stationary frame to hold the flexible connector in releasable engagement with the drive. In one embodiment, the flexible connector was a chain and the drive included a drive sprocket. The drive hoisted the movable frame by means of the flexible connector onto the stationary frame. The drive engaged the under side of the movable frame so as to translate the movable frame along the length of the stationary frame with the result that the movable frame was positioned directly on top of the stationary frame to provide the load bed mounted on the movable frame as a flat bed for the vehicle. Thus a load mounted onto the load bed could be transported by the vehicle and subsequently unloaded onto the ground so as to leave the load supported on the movable frame resting on the ground. Alternatively, the movable frame and bed could be placed onto the ground and a load mounted thereon, whereafter, the movable frame, bed and load could be hoisted onto the stationary frame for transport by the vehicle.

My Canadian Patent No. 2,434,792, and my corresponding U.S. Pat. No. 6,857,840 which issued Feb. 22, 2005, are incorporated herein by reference.

What my previous Removable Load Bed for Vehicles invention did not provide for, and to which the present invention is directed, was detaching the load bed from the movable frame when the load bed, whether or not carrying a load thereon, was mounted on the movable frame and the movable frame unloaded from the stationary frame so as to rest on the ground. I realized that, if the load bed was converted to a platform having for example legs so that it could stand alone elevated a small distance above the ground, I could detach the movable frame from underneath the load bed platform, reload the movable frame onto the stationary frame, thereby allowing the vehicle to depart to pickup a second load bed whether loaded or not, from a different location, where the second load bed was also provided as a stand alone platform. Thus, in order to pickup the second load bed platform, the vehicle merely has to backup to the second load bed platform, unload the movable frame from the stationary frame, guide the unloaded movable frame underneath the platform, secure the movable frame to the platform, and reload the movable frame with the platform mounted thereon back onto the stationary frame so as thereafter transport the platform. Thus I envisioned that such a movable frame and detachable platform would be useful for a preloaded platform which for example may have loaded thereon the equipment necessary for a particular job or jobsite, or may have loaded thereon a portable toilet to be delivered to or moved from a jobsite, or may include a preloaded platform having recreational vehicles ready to go and mounted thereon, for example a pair of ATV's or a pair of snowmobiles, all of which may be simply transported and left in a desired location The desired location may be a storage or job site.

The operator may merely leave behind the loaded platforms, without having to leave behind the movable frame as would have been the case in my previous Removable Load Bed for Vehicles. This allows the movable frame to be re-used to transport other loads on other similar platforms. Pre-loaded platforms may thus be stored ready for use and immediately transported when needed at particular locations without delay. Equipment, amenities, small habitats such as so-called micro-houses may all be pre-configured and preloaded onto a platform waiting transport or retrieval, without the need to strand a movable frame with each platform.

The adaption of my previous removable load bed for vehicles thus required that I sever the movable frame from the load bed, and adapt the load bed to provide a stationary platform. The improvements which this entailed in order to enable the present invention are both summarized and described in detail below.

SUMMARY OF THE INVENTION

In summary, the removable platform and load bed according to the present invention for a vehicle having a stationary frame, may be characterized in once aspect as including a movable frame which is detachably mountable to a platform so that the combination of movable frame and platform may be hoisted and onto the vehicle when stationary vehicle. The movable frame is thus adapted to be loaded onto and unloaded from the stationary frame mounted on the vehicle. The movable frame has opposite front and rear ends. A longitudinal direction ground surface translator such as a roller or slide plate, etcetera, is mounted under the rear end for translation of the rear end of the movable frame on the translator when the translator is in contact with an under-lying ground level surface.

The platform may be mountable onto the movable frame and releasably secured thereon. The platform and movable frame are thus hoisted simultaneously when being loaded and unloaded from the stationary frame. The platform has front and rear legs. The rear legs are positioned forwardly inset from the rear-most end of the platform bed so as to provide a pivoting function. In particular, when the front section of the movable frame is lifted by the flexible connector and drive on the stationary frame, rails on the movable frame are lifted and contact the underside of the platform resting on its legs on the ground. As the front section of the platform is raised on the front section of the movable frame, the rear sections of the platform lower as the platform pivots about the base of the rear legs.

The platform includes a load-bearing deck mounted onto a support frame. Downwardly depending support legs are mounted to the frame. The legs are of sufficient length to maintain the frame and deck by a first distance elevated above the ground level surface when the legs are resting down of the ground level surface. The movable frame includes a first portion for insertion under the frame and deck of the platform. The first portion has a corresponding first height above the ground level surface when the movable frame is resting in a lowered position on the longitudinal direction ground surface translator and unloaded from the stationary frame. The first height is less than the first distance so that in the lowered position the movable frame is translatable longitudinally relative to, and under, the deck and frame of the platform without obstruction. However, when in a first raised position the movable frame engages with an underside of the platform. The platform and movable frame further include interlocks cooperating between platform and the movable frame so that when the movable frame is in the first raised position the movable frame centres and mates with the underside of the platform. The interlocks releasably secure the platform down onto the movable frame wherefrom the combination may be hoisted into a second raised position ready for hoisting the combination onto the stationary frame. The platform and movable frame are thereafter securely hoistable from the second raised position as a unitary combination onto the stationary frame.

The interlocks may include a first interlock at the front end of the movable frame and a second interlock at the rear end of the movable frame. The first and second interlocks may each include a male component interlocking into a female component as the platform bears down onto the movable frame as the movable frame is raised to the first raised position from the lowered position.

In one embodiment at least one of the first and second interlocks may include at least one wedge for guiding the male component into the female component. For example, each of the first and second interlocks may include a wedge component. At least one of the wedge components centre the platform on the movable frame.

A further centering device may include a pair of flexible substantially non-resilient members such as chain, cable, etcetera mountable to, and so as to extend between the frame of the platform and the rear end of the movable frame. The pair of members are positioned on directly opposite sides of the movable frame. The pair of members are adapted to tension and, when tensioned, triangulate the rear end so as to centered between laterally opposite sides of the frame of the platform.

The first interlock may include a laterally extending wedge for guiding a laterally extending male member into a laterally extending female receiver. The second interlock may include an upstanding wedge on the movable frame engaging upwardly into a correspondingly wedge-shaped female receiver on the frame of the platform. The second interlock thereby centres the platform on the movable frame. A lock-down member may be provided which is releasably mountable to the movable frame and over a front end of the platform when overlaid onto the front end of the movable frame. The lock-down member locks the front of the platform down onto the front of the movable frame. The front end of the movable frame may include at least one rigid upright. The lock-down member may be releasably securable thereto. The lock-down member may be a laterally extending elongate member such as a bar.

The female receiver of the first interlock may include a laterally extending channel formed between the upright(s) and the wedge(s) on the front end of the movable frame.

At least one hoist engaging member, such as pair of chains, may be mounted at the front end of the movable frame. The hoist engaging member is adapted to engage a driven hoist such as a hoist having a drive sprocket on the vehicle whereby the movable frame is hoistable onto the stationary frame. The hoist engaging member provides for lowering of the movable frame downwardly into the lowered position and hoisting therefrom into the first and second raised positions.

The interlocks also include tie-downs. The tie-downs are releasably mountable between the platform and the movable frame. The tie-downs may be located at the front and rear ends of the movable frame. A tow-member such as a further length of chain may be mounted to the upright(s). The tow member is adapted for releasably mounting to the vehicle. Using the tow member, the vehicle may tow the movable frame from under the platform. The upright member(s) may include a laterally spaced apart pair of substantially vertical rigid upright members. The tow members may be mounted to the upper end of the uprights.

DETAILED DESCRIPTION OF EMBODIMENTS OF THE INVENTION

The present invention includes two basic components; namely, a movable frame 10 and a platform 12 adapted to be releasably and securely mounted onto the movable frame 10. Movable frame 10 is adapted to be loaded and unloaded onto the stationary frame on a vehicle such as for example by the mechanism described in my Canadian Patent 2,434,792 or my U.S. Pat. No. 6,857,840 both entitled Removable Load Bed for Vehicles, collectively herein my "previous patents", and as described above.

Figure 1:
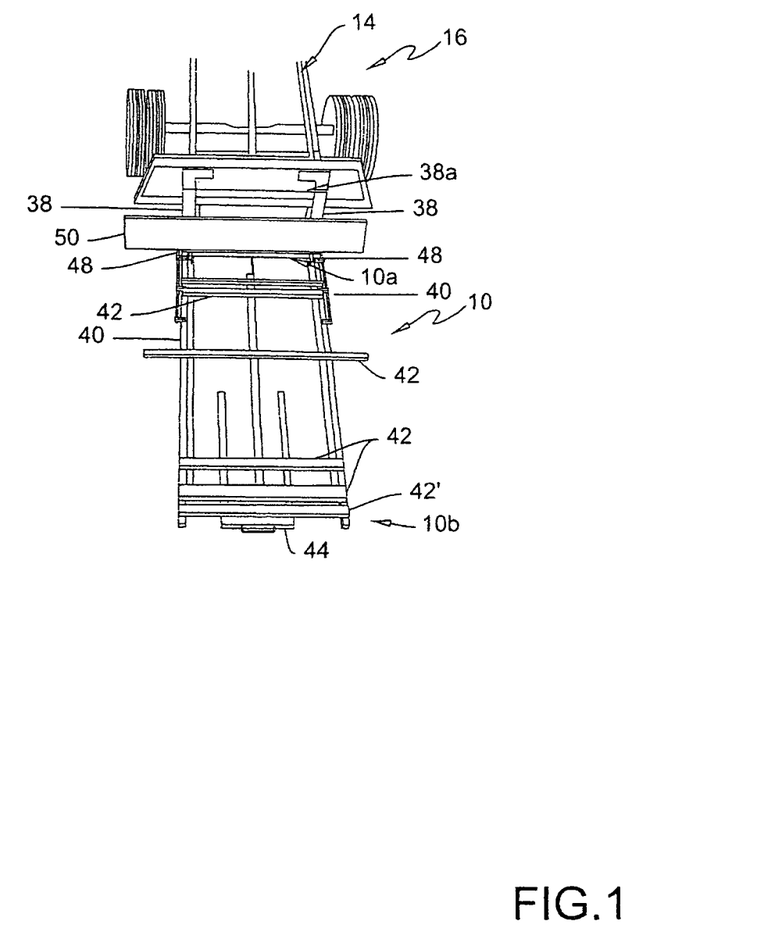
FIG. 1 is, in rear perspective view, the vehicle and stationary frame in front of a lowered movable frame resting on the ground.

Thus in one embodiment, which is not intended to be limiting, a stationary frame 14 is mounted rigidly onto, so as to form part of, a vehicle 16 which advantageously is a truck, and where the stationary frame 14 of the vehicle is advantageously mounted behind the truck cab. A hoist or winch arrangement or preferably the loading arrangement, described in detail in my previous patents loads and unloads movable frame 10 from stationary frame 14. Such a loading arrangement may employ a drive at the rear end of the stationary frame, and in particular may include a pair of drive sprockets 18 which raise and lower the movable frame by means of a flexible connector such as a pair of chains 20. The drive sprockets 18 also advantageously engage a toothed rail 22 allowing the underside of the movable frame to be selectively translated longitudinally relative to the stationary frame of the vehicle.

Figure 2:
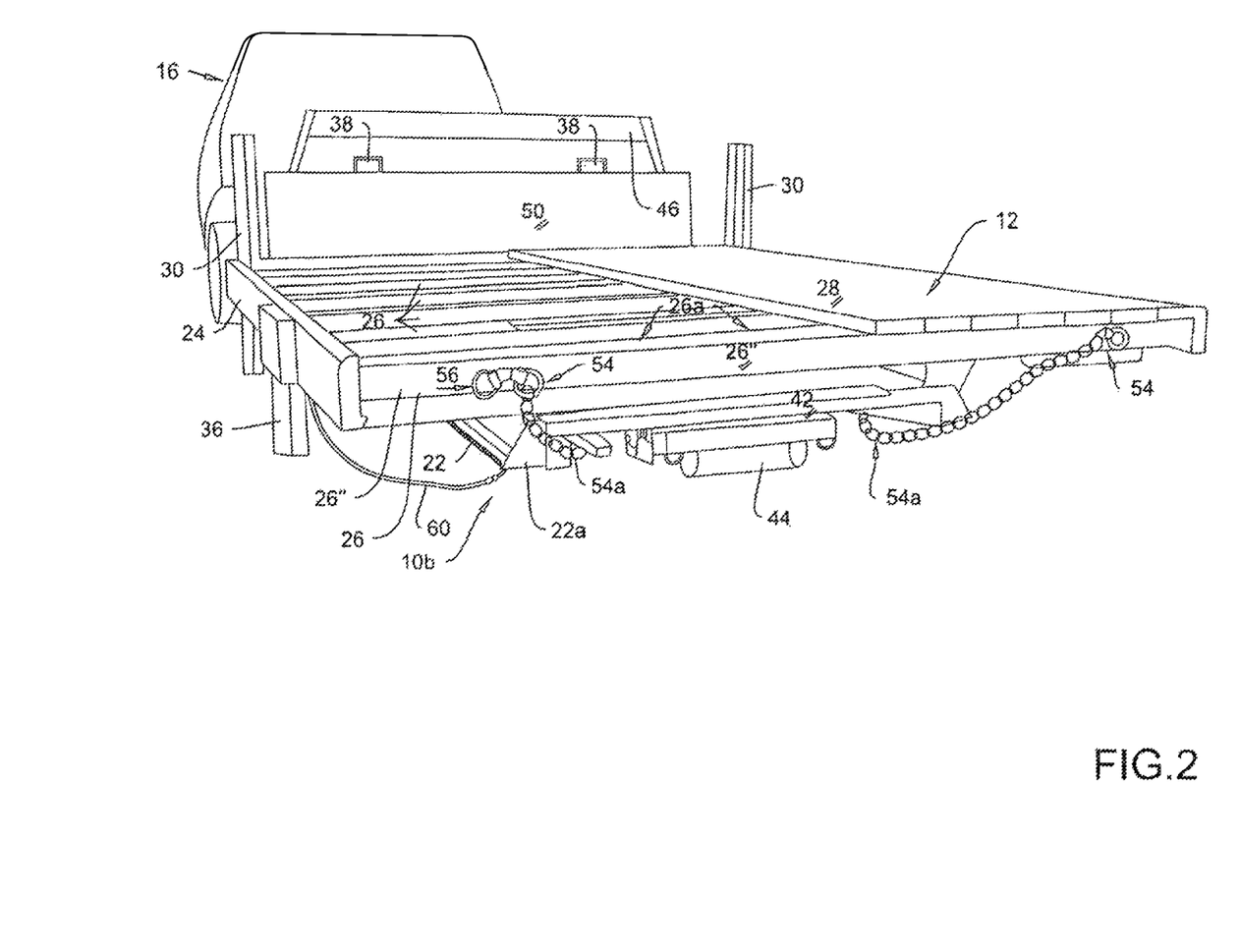
FIG. 2 is, in rear left side perspective view, a platform according to one embodiment of the present invention resting on the ground with a movable frame inserted underneath the platform with the floor planking on the left side of the platform removed.
Figure 3:
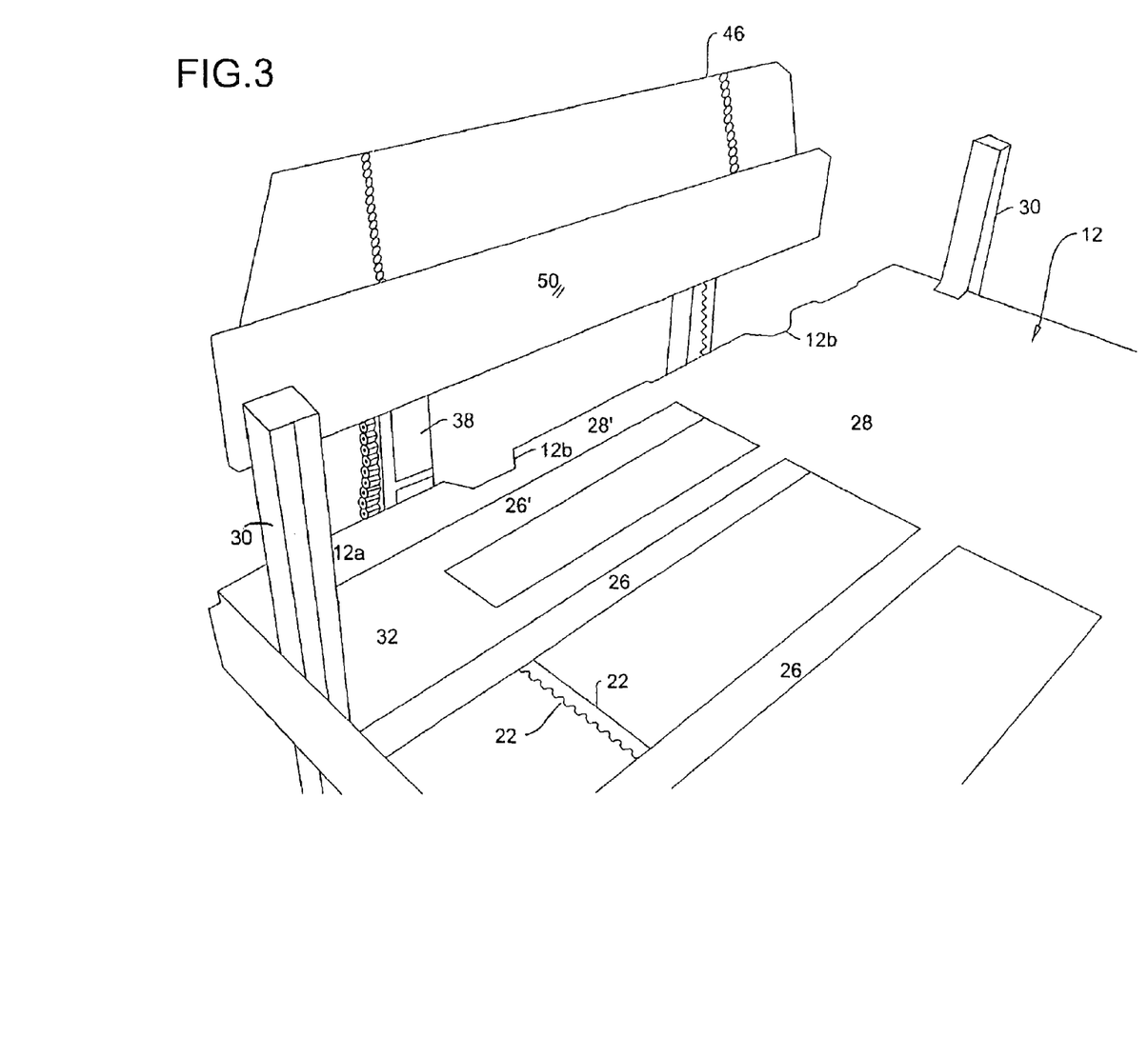
FIG. 3 is, in upper left side rear perspective view, the forward end of the platform and movable frame of FIG. 2 showing the locking bar elevated and temporarily suspended from the top of the protective wall by a pair of chains, and showing the platform disengaged from the movable frame and the movable frame having been pulled slightly forward from its insertion underneath the platform.
Figure 4:
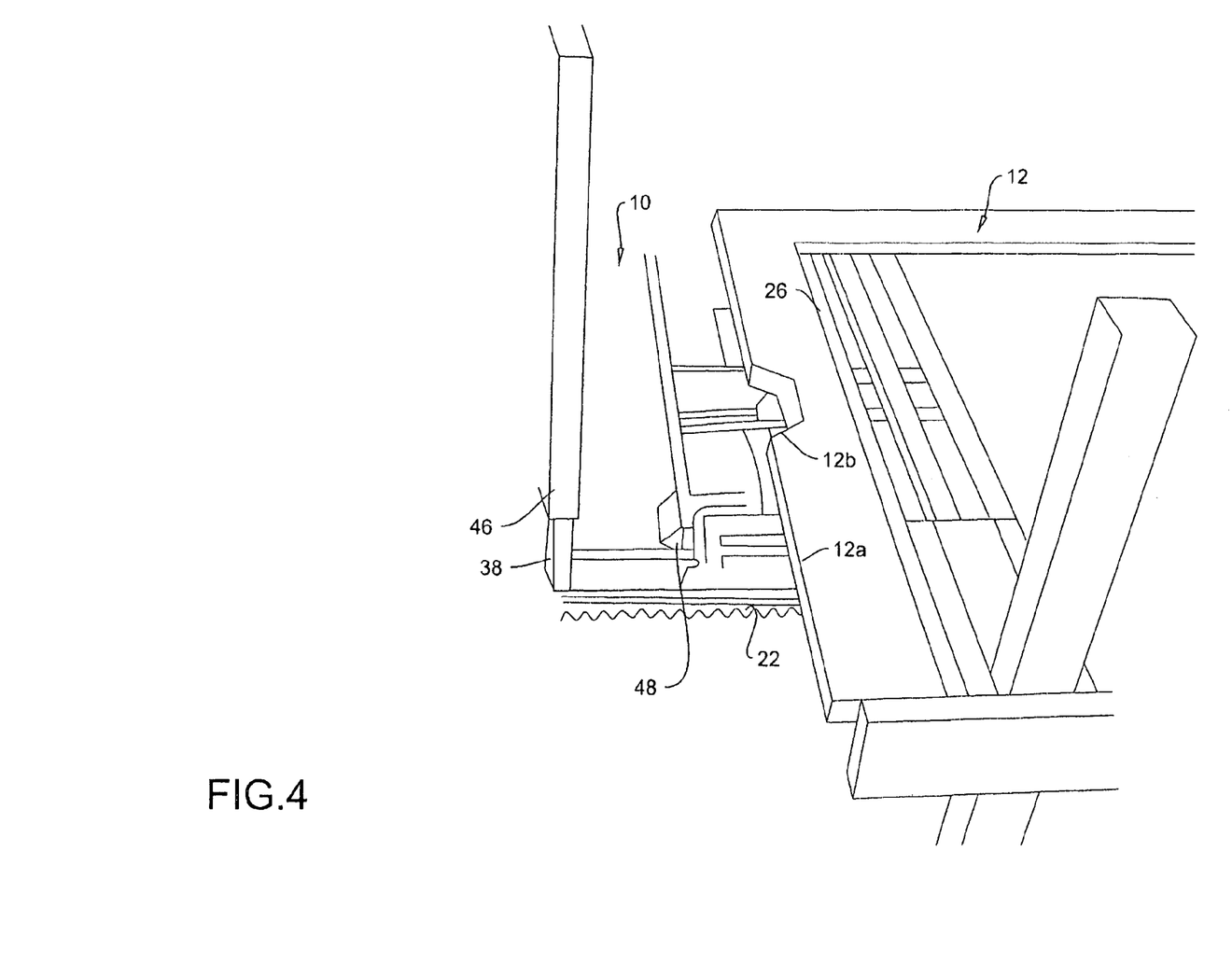
FIG. 4 is, in upper left side perspective view, the platform and movable frame of FIG. 3 with the locking bar removed and the movable frame slightly further advanced forwardly from underneath the platform.

In one embodiment, which is not intended to be limiting, platform 12 may be a relatively inexpensive wooden assembly consisting of an outer frame having side members 24, cross members 26 and floor boards 28. In a preferred embodiment, ply-wood sheeting is mounted underneath floor boards 28 so as to snugly fit between the cross members 26 to thereby reinforce the frame work. A pair of vertically adjustable forward legs 30 are slidably mounted through corresponding apertures formed within blocking 32 mounted or formed between the forward cross members 26' and the next adjacent cross members 26. Forward legs 30 are vertically adjustable by the use of removable pins 34 journalled through apertures 30a. Apertures 30a are formed as a vertically linearly spaced apart array of such apertures in forward legs 30. The rear of platform 12 may be supported on a pair of fixed rear legs 36 mounted to outer frame members 24. The rear legs are positioned forward of the rear of the platform. When the front section 10a of the movable frame 10 is lifted by the turning sprocket 18 and lift chain 20, the movable frame rails 22 contact and lift upwardly under the platform 12 and cross member 26 causing the rear section 10b of the platform to lowers, with the pivot point of the platform being the base of the rear legs 36 where they are in contact with the ground. The use of the pivot about the inset rear legs reduce the length of the movement arm and this reduces the required movement to pivot and lift heavy loads on the platform, as compared to merely pivoting the entire platform upwardly about the very end of the platform, for example entirely about roller 44. The use of the inset rear legs as a pivot also reduces the bowing of the platform under heavy loading.

The front edge 12a of platform 12 has a laterally spaced apart pair of notches 12b formed therein. Notches 12b are spaced apart sufficiently in size so as to snugly mate with the vertical uprights 38 mounted on the front end of movable frame 10 as better described below.

Figure 13:
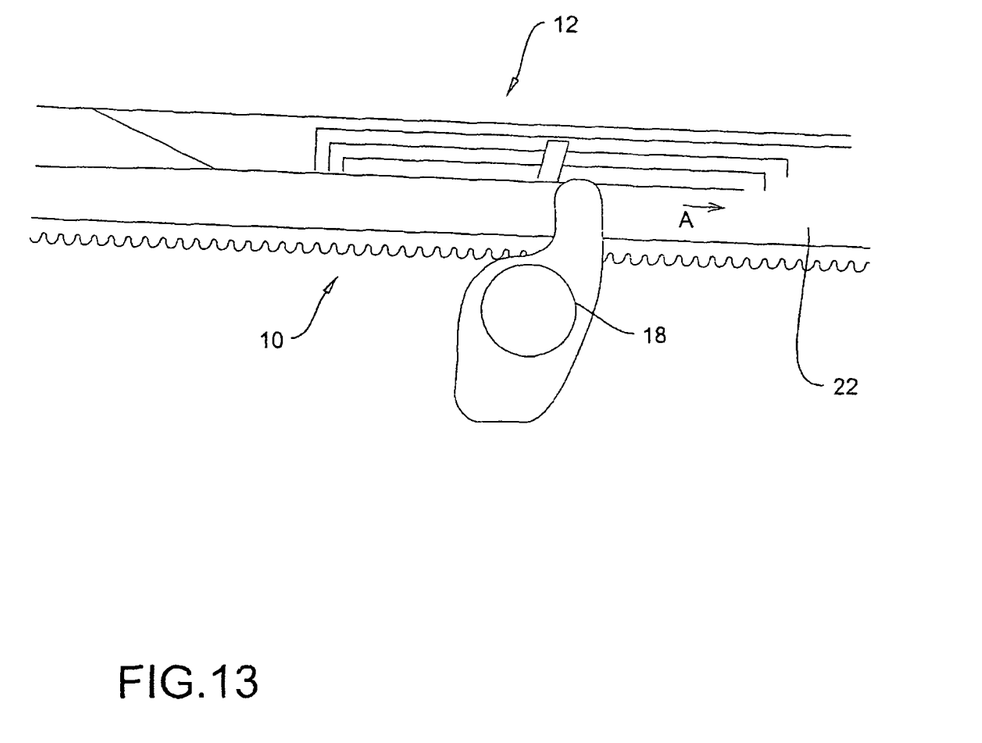
FIG. 13 is, in partially cut-away left side elevation view, the movable frame in a horizontal position as it would appear resting on top of the stationary frame, and being translated rearwardly by the drive pulleys on the rear of the stationary frame.

Movable frame 10 includes a parallel pair of side rails 40 supporting rigidly mounted cross members 42 mounted laterally thereover so as to provide a rigid rectangular frame. Longitudinally extending toothed rails 22 extend parallel to side rails 40 and extend from the front end 10a of movable frame 10 to substantially the rear end 10b. A roller 44 is rotatably mounted below the rearmost cross member 42' so as to be medially disposed between the rearmost ends of side rails 40. Roller 44 and rolls on contacts the ground as movable frame 10 is unloaded in direction A as seen in FIG. 13 from stationary frame 14. As the frame 10 is lowered rear legs contact the ground and the frame then pivots downwardly about the rear legs.

Figure 5:
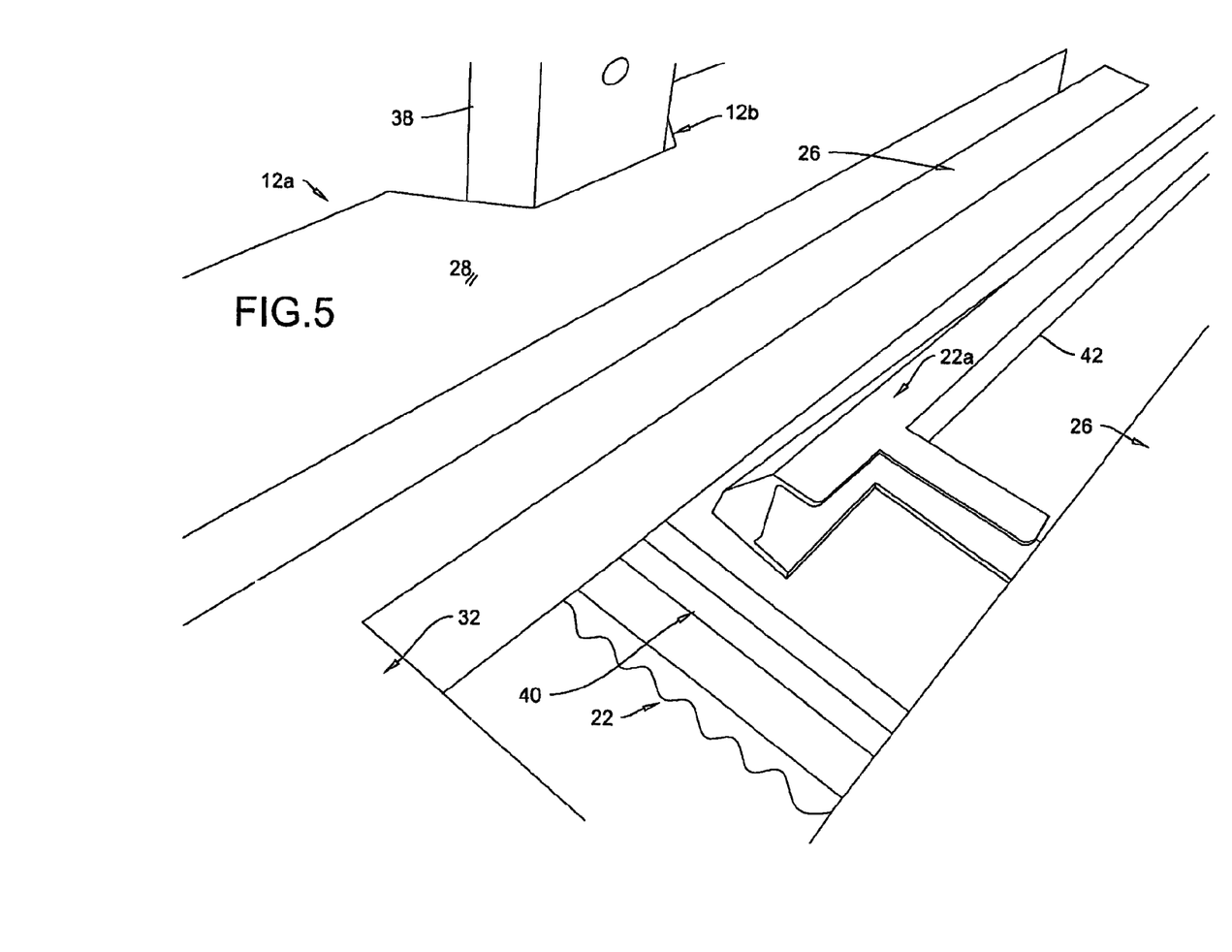
FIG. 5 is, in upper left side rear perspective view, a portion of the front ends of the movable frame and platform of FIG. 2 showing the front end of the platform mated down onto the movable frame.
Figure 6:
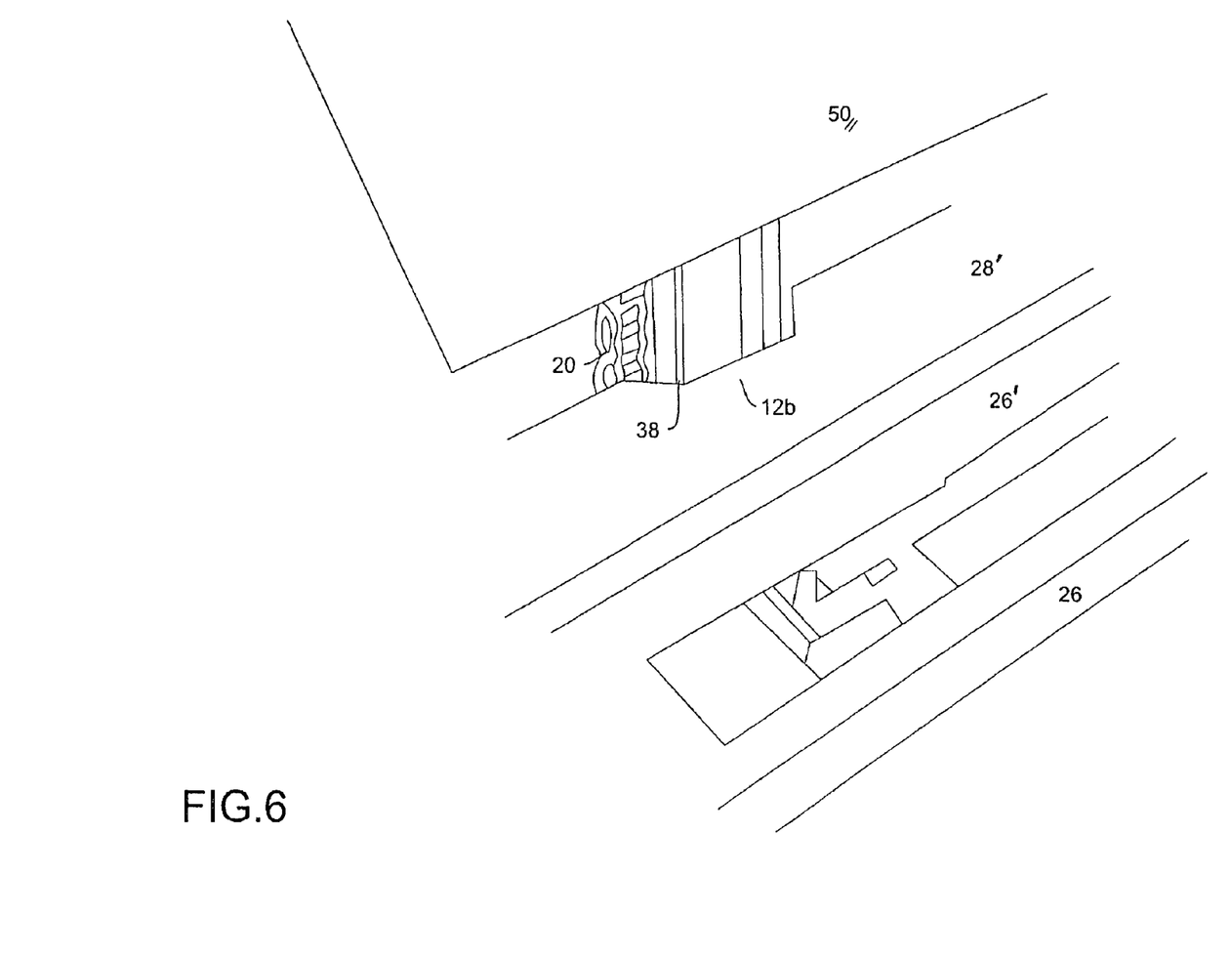
FIG. 6 is, in upper rear left side perspective view, the mating of the front end of the platform onto the front end of the movable frame of FIG. 5 showing the locking bar suspended on a pair of lengths of chain above the front end of the platform awaiting lowering into locking engagement down against the front end of the platform.
Figure 7:
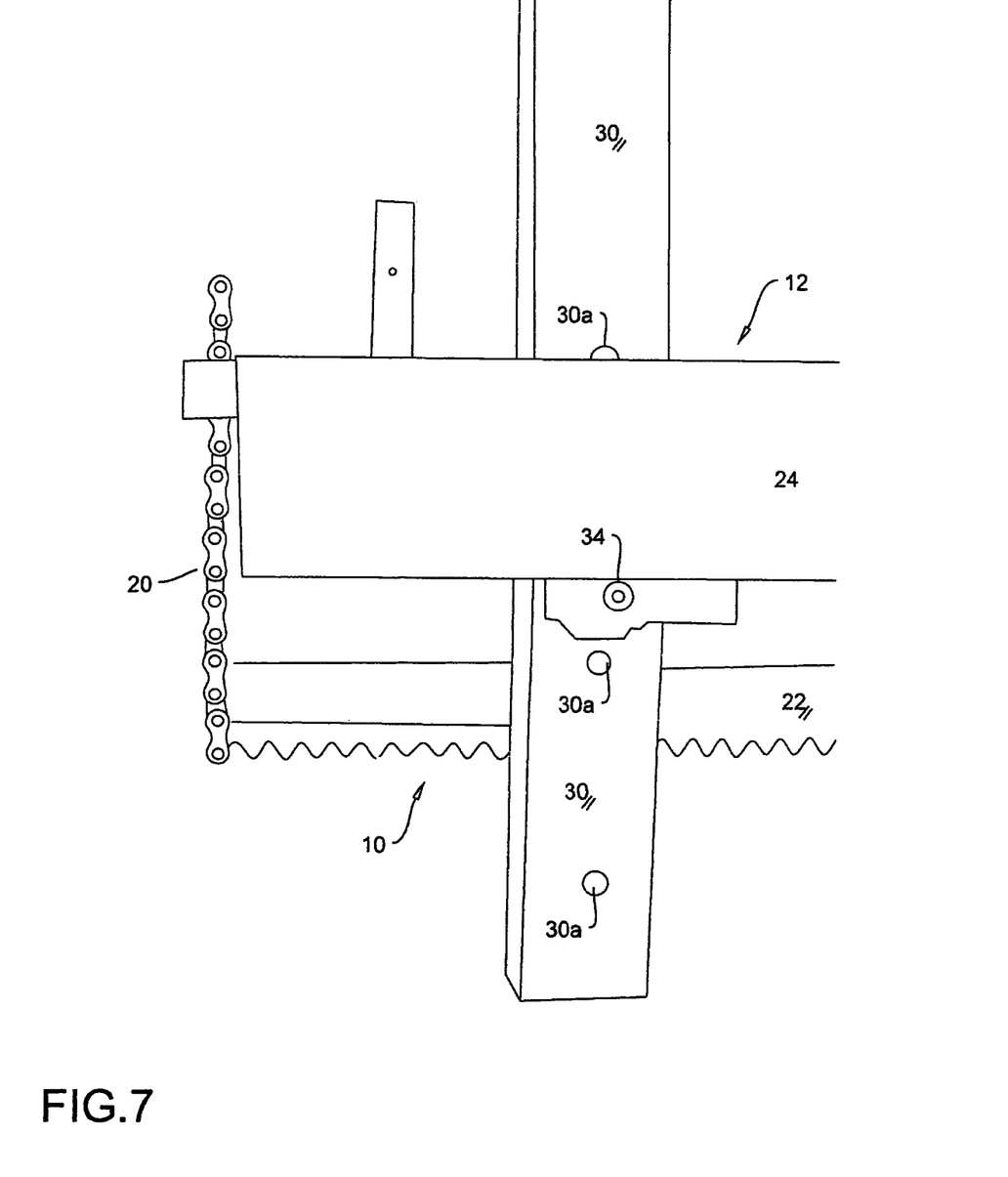
FIG. 7 is, in left side elevation view, the front end of the platform mounted onto the front end of the movable frame, and showing a portion of the hoisting chain extending upwardly from the front end of the movable frame.

As stated above, vertical uprights 38 are rigidly mounted to the front end 10a of movable frame 10, and in particular, are spaced apart laterally so as to be substantially in line with side rails 40. In one embodiment (not shown) a laterally extending cross member is rigidly mounted across the top ends of vertical uprights 38. In another embodiment, instead of use of a cross member, a vertical uprights 38 are mounted to a end-wall 46 which provides vertical uprights 38 with lateral stability and which protects the back of the truck cab while loading of platforms 12 when used as a conventional flat-bed. With platform 12 mounted on movable frame 10, vertical uprights 38 fit snugly into notches 12b along front edge 12a. Front cross member 26' seats snugly down onto rails 22 guided by a sixty degree incline on guiding wedges 48 mounted onto the top of rails 22. The use of a sixty degree incline is not intended to be limiting as other angles would work so long as centering cables 60 are of appropriate length so that platform 12 is urged down onto frame 10. With the front end of platform 12 thus snugged down onto rails 22, a locking plate 50 is lowered down onto the front decking plank 28' and secured as by bolting to vertical uprights 38 to thereby lock the front end of platform 12 down onto movable frame 10 and in particular down onto rails 22. Simultaneously, the rear end of platform 12, and in particular rear cross member 26", also seat snugly down onto movable frame 10 so as to engage a slanted-end auxiliary cross member 26a, and in particular the slanted innermost end of auxiliary cross member 26a, so as to guide and center rear cross member 26" onto each of a pair of laterally outwardly disposed rigid centering wedges 22a mounted on the laterally outer sides of rails 22. Thus with uprights 38 engaging in notches 12b and the pair of auxiliary cross members 26a engaging down onto the corresponding pair of centering wedges 22a, platform 12 is centered when dropping down onto movable frame 10.

With platform 12 so resting on movable frame 10, platform 12 may be releasably secured to movable frame 10 by many conventional means which would be known to one skilled in the art as for example and without intending to be limiting by means of shackled chains 52 which releasably mount for example by the use of pinned shackles to the front edge 12a of platform 12 and at their opposite ends to the side of vertical uprights 38 on movable frame 10. Likewise, the rear end of platform 12 may be secured to the rear end of movable frame 10 by the use of shackles 54. Rear shackles 56 may be used by an operator to assist tethering a load onto a platform 12. Chains 54a extend between the rear end of movable frame 10 where they are mounted, upwardly to shackles 54 mounted on the rear end of platform 12.

When for example it is desired to leave a load at work site, and the load is being transported to the work site on platform 12 by vehicle 16, and once movable frame 10 with platform 12 mounted thereon has been unloaded from the vehicle once it arrives at the job site, it may be that the operator may desire to leave the load on platform 12 but would like to retrieve movable frame 10 so as to load it back up onto stationary frame 14 to thereby free the operator to fetch another load mounted on another platform 12. Thus once at the job site, the platform 12 to be left along with its corresponding load is unloaded from stationary frame 14 so as to leave platform 12 resting on the ground on legs 30 and 36. Vertical legs 30 may have to be elevated as the combination of platform 12 mounted on movable frame 10 as they are being either loaded or unloaded from stationary frame 14 so that the lower most ends of legs 30 do not catch on the rear tires of vehicle 16.

Figure 8:
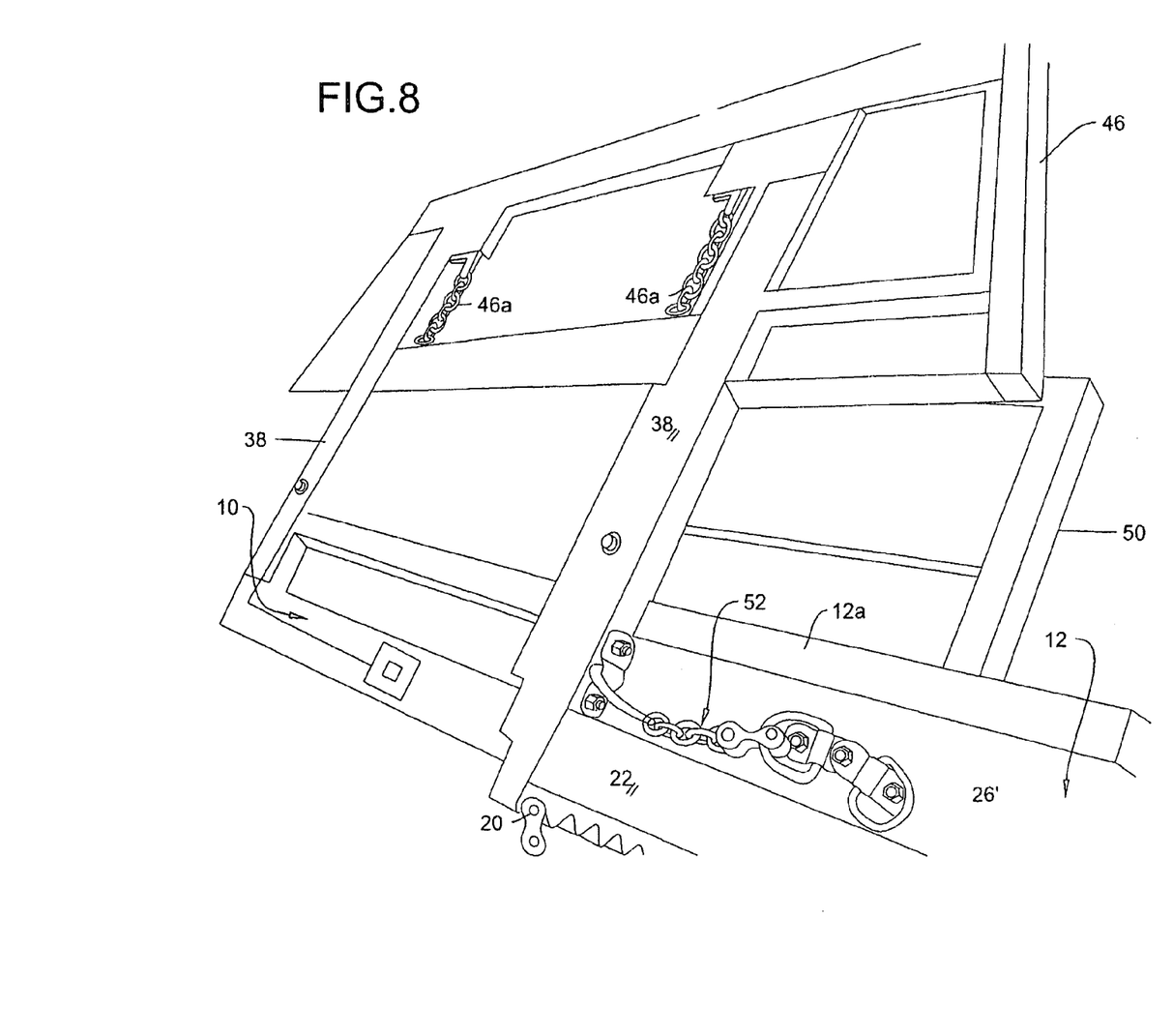
FIG. 8 is, in left side front perspective view, the platform and movable frame of FIG. 5 with the front end of the platform and movable frame elevated to the height of the stationary frame on the vehicle.

Thus with platform 12 resting down on the ground on legs 30 and 36, shackled chains 52 as seen in FIG. 8 may be released and shackles 54 released from chains 54*a* as seen in FIG. 2, so that movable frame 10 may be further lowered relative to the underside of platform 12 once locking plate 50 has been unbolted from uprights 38 and removed. The further lowering of movable frame 10 disengages the notches 12*b* and the front cross member 26' from their position seated between vertical uprights 38 and inclined guiding wedges 48. In the illustrations locking plate 50 is shown removed and conveniently stored suspended by lengths of chain from the top of wall 46. As movable frame is further lowered to release it from coupling under platform 12, the rear end of movable frame 10 and in particular wedges 22*a* are released from their mating engagement against the inner most ends of auxiliary cross members 26*a*.

Figure 9:
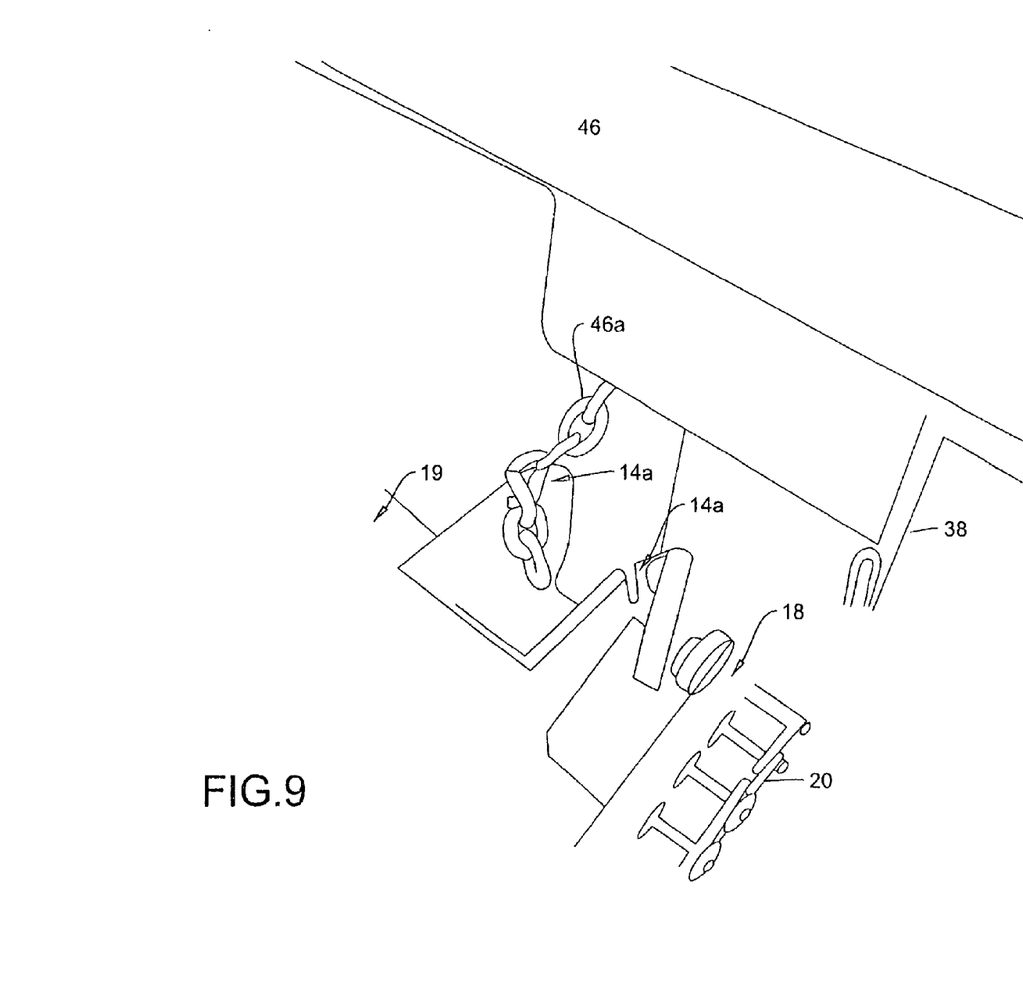
FIG. 9 is, in front left side upper perspective view, the tow chains extending between the front end of the movable frame and the rear end of the stationary frame ready for towing the movable frame out from underneath the platform.

With movable frame thus lowered so as to be free of the underside of platform 12, pull chains 46*a* mounted to the forward side of wall 46 are attached to the rear end of stationary frame 14, for example, by sliding one of the links of each of chains 46*a* into correspondingly sized slots 14*a* formed for example at the rear of stationary frame 14 adjacent drive sprockets 18. With movable frame 10 thus releasably connected to the rear end of stationary frame 14, vehicle 16 may be pulled ahead to thereby extract movable frame 10 rolling on roller 44 out from underneath platform 12. Once movable frame 10 is clear of platform 12, movable frame 10 may be loaded onto stationary frame 14 for transport. This then leaves behind a relatively inexpensive platform 12 with a desired load at a desired location where the load may be put to use for example at a job site or place of recreation, etcetera. The movable frame can be pulled out, and the truck can then be driven and turned, backed up and with the movable frame aligned with a second platform and backed under the second platform without loading the movable frame onto the truck, thereby saving valuable time when simply swapping platforms at the same job site. The pull chains 46*a* ties the movable frame to the truck, unlike an extension of the truck frame.

It may be that various loads will need to be moved from job site to job site for example if a particular load includes a portable toilet, the toilet will have to be removed for cleaning and replaced. Thus it is desirable that the reloading of a platform 12 onto movable frame 10 be uncomplicated, and it is an object of the present invention to provide that.

Thus when an operator desires to reload a platform 12 which has been left, the operator in vehicle 16 pulls up in front of platform 12 leaving a sufficient distance between vehicle 16 and the front end of platform 12 so that movable frame 10 may be unloaded fully from stationary frame 14. Movable frame 10 is then unloaded from stationary frame 14 so as to position movable frame 10 on the ground with the front end 10*a* adjacent the rear end of stationary frame 14 and connected thereto by means of connector chains 20, and with rear end 10*b* of movable frame 10 positioned in front of the front end of platform 12. Movable frame 10 has been lowered to its lowered position immediately above the ground so that it may be pushed rearwardly under platform 12 as vehicle 16 drives in reverse.

Figure 10:
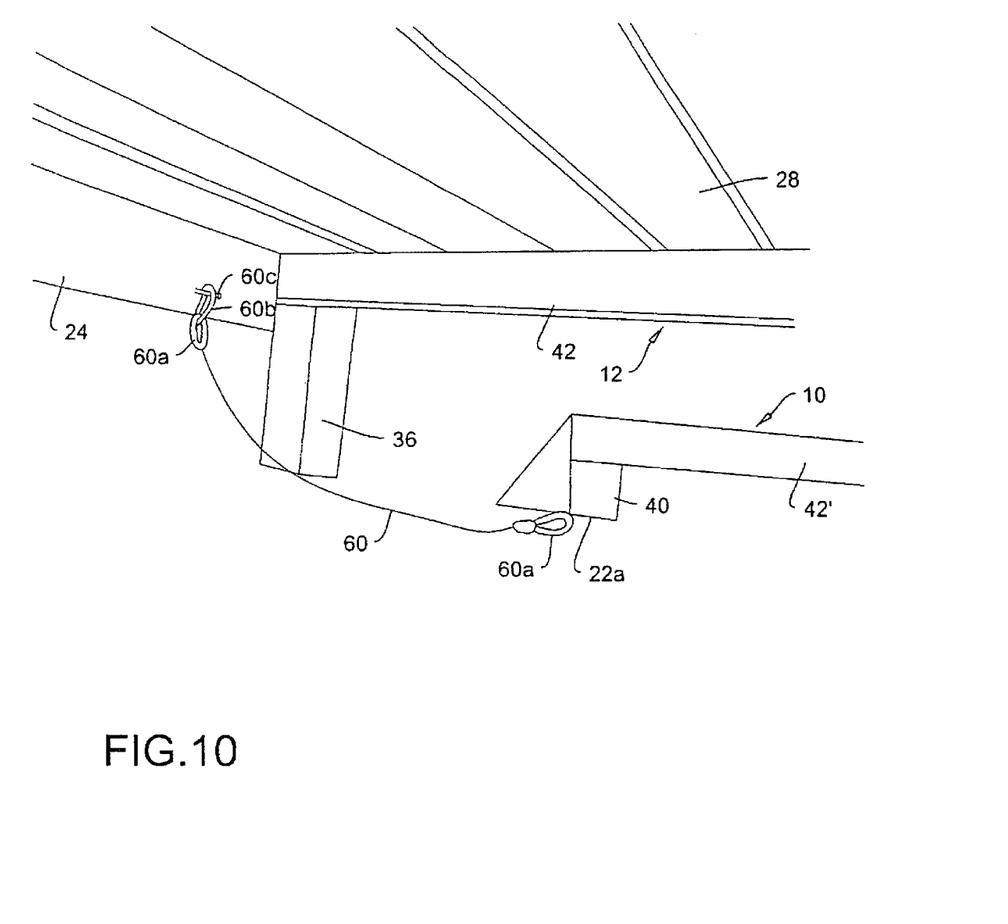
FIG. 10 is, in lower rear left side elevation view, the underside of the platform and the rear of the movable frame, with a centering cable mounted between the side of the platform and the side of the movable frame.
Figure 11:
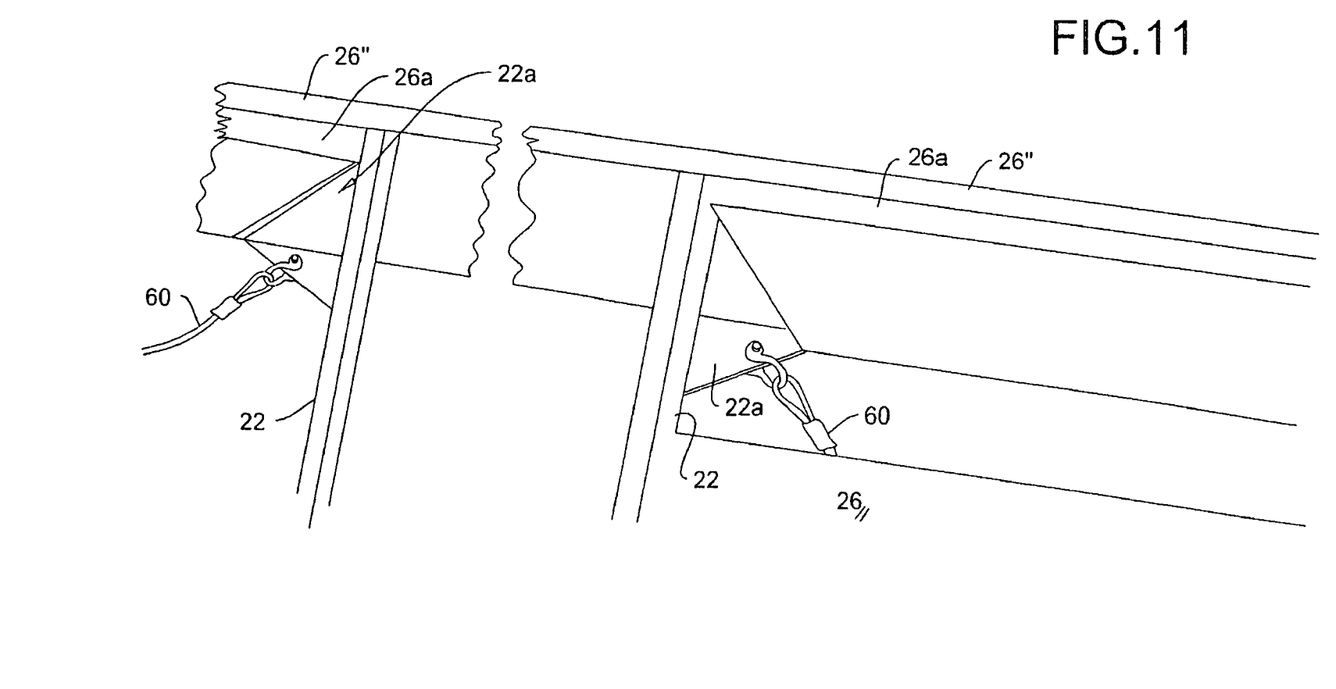
FIG. 11 is, in upper front left side elevation view, the end of the centering cable of FIG. 10 where it is attached to the rear end of the movable frame.

To assist the operator with the initial alignment of movable frame 10 as it translates rearwardly on roller 44 underneath platform 12, a pair of upstanding guide rods (not shown) may be mounted into corresponding apertures in front floor board 28' so that, with the guide rods marking the positions of uprights 38 and rails 22 the operator will be able to approximately align movable frame 10 under platform 12. Once movable frame 10 is approximately three quarters of the way underneath platform 12, the operator attaches centering lines 60, which may be cables, chains or the like, between side rail members 24 on platform 12 and wedges 22*a* on movable frame 10. With a centering line so attached on either side of the rear end 10*b* of movable frame 10, as the operator then continues to insert movable frame 10 underneath platform 12, the lines 60 tighten and triangulate to center the rear end 10*b* positioned centered underneath the rear cross member 26".

With movable frame 10 thus positioned and centered underneath platform 12 the drive on the rear end of stationary frame 14, and in particular drive sprocket 18 tensioning connector chains 20, may be employed to elevate movable frame 10 so as to once again seat notches 12*b* down against uprights 38 thereby seating cross member 26' snugly down wedged between guiding wedges 48 and uprights 38, and so as to also snug auxiliary cross members 26*a* down onto wedges 22*a*. The shackles may then be secured by the operator to secure platform 12 down onto movable frame 10. Thereafter movable frame 10, carrying platform 12 and the load on platform 12 may be loaded onto stationary frame 14 for transport.

Figure 12:
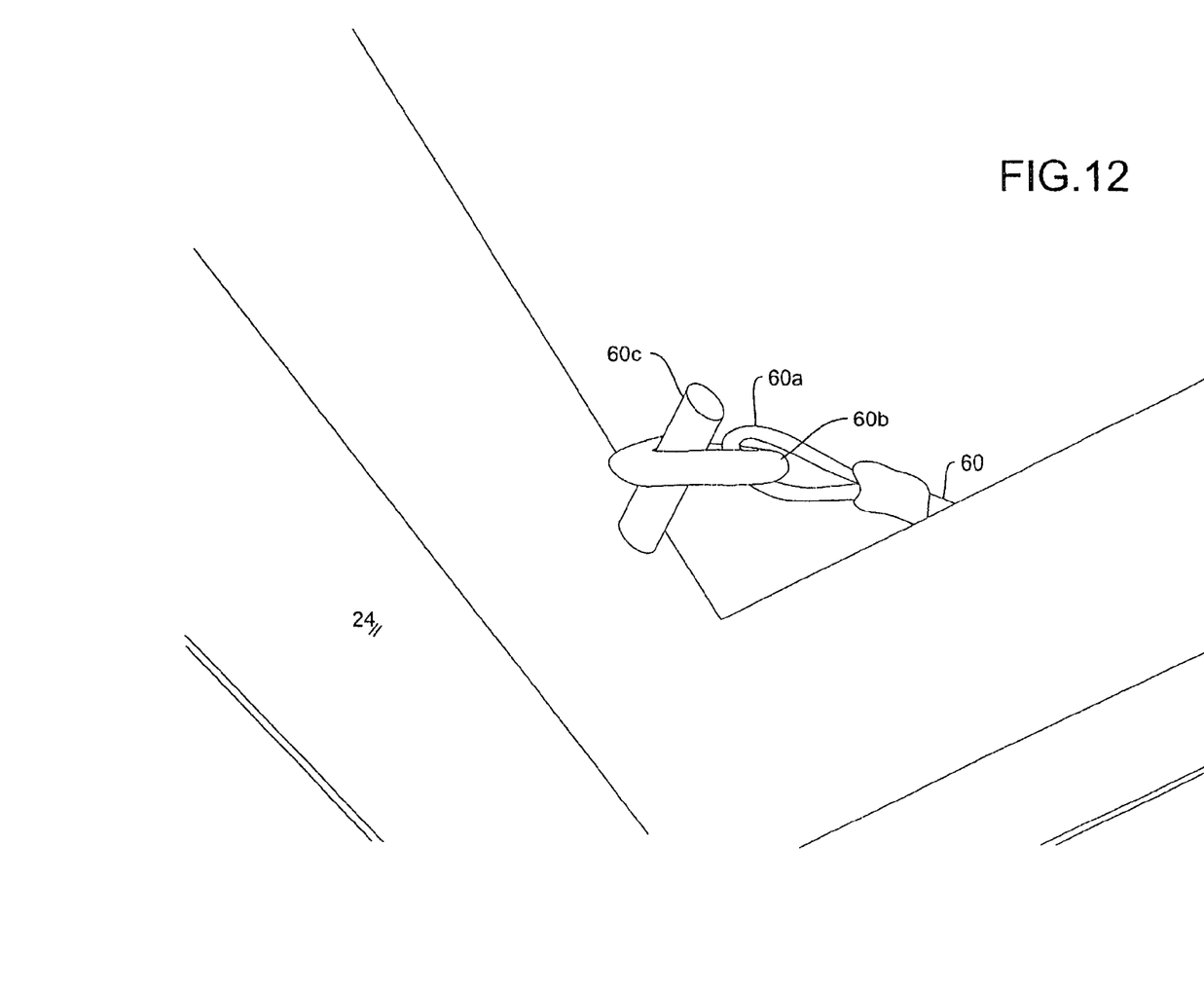
FIG. 12 is, in top perspective view, the end of the centering cable where it is mounted to the side frame member of the platform.

Centering lines 60 do not have to be uncoupled when it is desired to remove movable frame 10 out from underneath platform 12 if, as seen in the preferred embodiment, end 60*a* of centering lines 60 are releasably mounted into side rail members 24 for example by use of rings 60*b* hooked onto forwardly projecting studs 60*c*.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A removable platform and load bed apparatus for a vehicle, the apparatus comprising:
a movable frame adapted to be loaded onto and unloaded from the vehicle, said movable frame having opposite front and rear ends, wherein a longitudinal direction ground surface translator is mounted to said movable frame under said rear end of said movable frame for translation, relative to the vehicle, of said rear end of said movable frame on said translator when said movable frame is unloaded from the vehicle such that said translator is in contact with an under-lying ground level surface; and
a platform both mountable onto said movable frame and releasably securable onto said movable frame, said platform for hoisting simultaneously with hoisting of said movable frame when being loaded onto and unloaded from the vehicle,
wherein said movable frame includes a first portion positionable for insertion under at least a portion of said platform when said movable frame is unloaded from the vehicle and in a lowered position,
and wherein said movable frame engages with an underside of said platform when said first portion of said movable frame is positioned under said at least a portion of said platform and as said front end of said movable frame is raised to raise said movable frame from said lowered position to a first raised position, said platform and said movable frame further including interlocks cooperating between said platform and said movable frame so that when said first portion of said movable frame is positioned under said at least a portion of said platform and as said front end of said movable frame is raised to raise said movable frame from said lowered position to said first raised position, said movable frame mates with said underside of said platform so as to said releasably secure said platform to said movable frame for hoisting into a second raised position ready for hoisting onto the vehicle, whereby said platform and said movable frame are securely hoistable from said second raised position as a unitary combination onto the vehicle.

2. The apparatus of claim 1 wherein said platform includes a load-bearing deck mounted onto a support frame, and downwardly depending support legs mounted to said frame, wherein said legs are of sufficient length to maintain said frame and deck by a first distance elevated above the ground level surface when said legs are resting on the ground level surface, wherein said first portion of said movable frame has a corresponding first height above the ground level surface when said movable frame is resting in said lowered position on said longitudinal direction ground surface translator when said movable frame is unloaded from the vehicle, and wherein said first height is less than said first distance so that in said lowered position said movable frame is translatable longitudinally relative to, and under, said deck and frame of said platform without obstruction.

3. The apparatus of claim 2 wherein said interlocks include a first interlock at said front end of said movable frame, said first interlock comprising at least one rigid upright member on said movable frame and at said front end of said movable frame, and wherein said platform defines at least one forward-facing tapered notch at a front end of said platform such that as said first portion of said movable frame is positioned in said lowered position under said at least a portion of said platform, said at least one tapered notch receives a respective one of said at least one rigid upright member to align said movable frame laterally relative to said platform, and such that said movable frame is vertically movable relative to said platform when said at least one tapered notch receives said respective one of said at least one rigid upright member.

4. The apparatus of claim 3 wherein said first interlock further includes a transverse cross member of said platform, said transverse cross member receivable, as said front end of said movable frame is raised to raise said movable frame from said lowered position to said first raised position, in a transverse receptacle defined by said movable frame.

5. The apparatus of claim 4 wherein said first interlock includes a laterally extending wedge for guiding said transverse cross member of said platform, as said front end of said movable frame is raised to raise said movable frame from said lowered position to said first raised position, into said receptacle defined by said movable frame.

6. The apparatus of claim 5 wherein said receptacle includes a laterally extending channel formed between said at least one rigid upright member and said laterally extending wedge on said front end of said movable frame.

7. The apparatus of claim 3 further comprising a lock-down member releasably mountable to said movable frame and over said front end of said platform when overlaid onto said front end of said movable frame when said at least one tapered notch receives said respective one of said at least one rigid upright member.

8. The apparatus of claim 7 wherein said lock-down member is releasably securable to said at least one rigid upright member.

9. The apparatus of claim 8 wherein said lock-down member is a laterally extending elongate member.

10. The apparatus of claim 3 wherein said at least one rigid upright member includes a laterally spaced apart pair of substantially vertical rigid upright members.

11. The apparatus of claim 10 further comprising tow members mounted to said substantially vertical rigid upright members at upper ends of said substantially vertical rigid upright members, said tow members adapted for releasably mounting to the vehicle whereby, using said tow members, the vehicle can tow said movable frame from under said platform and move said movable frame with said movable frame tied to the vehicle.

12. The apparatus of claim 2 further comprising a pair of flexible substantially non-resilient members mountable to and so as to extend between said platform and said rear end of said movable frame, one each of said members on directly opposite sides of said movable frame, said pair of members adapted to tension and, when tensioned, triangulate said rear end of said movable frame centered between laterally opposite sides of said platform.

13. The apparatus of claim 2 wherein said longitudinal direction ground surface translator includes a rolling means.

14. The apparatus of claim 13 wherein said rolling means includes a roller.

15. The apparatus of claim 2 further comprising at least one hoist engaging member mounted at said front end of said movable frame, said hoist engaging member adapted to engage a driven hoist on the vehicle whereby said movable frame is hoistable onto the vehicle, wherein said hoist engaging member provides for lowering of said movable frame downwardly into said lowered position and hoisting therefrom into said first and second raised positions.

16. The apparatus of claim 15 wherein said hoist engaging member includes at least one length of chain.

17. The apparatus of claim 2 wherein said interlocks include tie-downs, and wherein said tie-downs are releasably mountable between said platform and said movable frame.

18. The apparatus of claim 17 wherein said tie-downs are located at said front and rear ends of said movable frame.

19. The apparatus of claim 2 further comprising a tow member mounted to said movable frame, said tow member adapted for releasably mounting to the vehicle whereby, using said tow member, the vehicle can tow said movable frame from under said platform and move said movable frame with said movable frame tied to the vehicle.

20. The apparatus of claim 2 wherein said legs comprise rear legs positioned forwardly inset from a rear end of said platform towards a front end of said platform.

21. The apparatus of claim 20 wherein said interlocks include a second interlock at said rear end of said movable frame.

22. The apparatus of claim 21 wherein said second interlock includes an upstanding wedge on said movable frame at said rear end of said movable frame, said wedge on said movable frame being configured to be received in a correspondingly wedge-shaped female receiver on a rear end of said platform, for centering said movable frame relative to said platform, as said rear end of said platform is lowered onto said rear end of said movable frame when said front end of said movable frame is raised to raise said movable frame from said first raised position to said second raised position and thereby to raise a front end of said platform and to pivot said platform about respective bases of said rear legs.

* * * * *